(12) United States Patent
Saffre et al.

(10) Patent No.: US 8,176,170 B2
(45) Date of Patent: May 8, 2012

(54) COMPUTER NETWORK

(75) Inventors: Fabrice TP Saffre, Ipswich (GB); Alexander L Healing, Ipswich (GB); Michal Jakob, Frydek-Mistek (CZ)

(73) Assignee: British Telecommunications public limited company, London (GB)

( * ) Notice: Subject to any disclaimer, the term of this patent is extended or adjusted under 35 U.S.C. 154(b) by 506 days.

(21) Appl. No.: 12/303,996

(22) PCT Filed: May 31, 2007

(86) PCT No.: PCT/GB2007/002038
§ 371 (c)(1),
(2), (4) Date: Dec. 9, 2008

(87) PCT Pub. No.: WO2007/144568
PCT Pub. Date: Dec. 21, 2007

(65) Prior Publication Data
US 2010/0115085 A1 May 6, 2010

(30) Foreign Application Priority Data
Jun. 13, 2006 (EP) .................................... 06253029

(51) Int. Cl.
G06F 15/173 (2006.01)
G06F 17/30 (2006.01)
(52) U.S. Cl. ....................................... 709/224; 707/758
(58) Field of Classification Search .................... 709/224
See application file for complete search history.

(56) References Cited

U.S. PATENT DOCUMENTS

| | | | |
|---|---|---|---|
| 5,442,791 A | 8/1995 | Wrabetz et al. | |
| 6,505,248 B1 | 1/2003 | Casper et al. | |
| 6,681,247 B1 | 1/2004 | Payton | |
| 6,765,864 B1 | 7/2004 | Natarajan et al. | |
| 7,133,905 B2 | 11/2006 | Dilley et al. | |
| 7,308,496 B2 * | 12/2007 | Yeager et al. | 709/224 |
| 7,792,915 B2 * | 9/2010 | Berkey et al. | 709/209 |
| 7,852,756 B2 | 12/2010 | Chen et al. | |
| 2002/0078174 A1 | 6/2002 | Sim et al. | |
| 2002/0120609 A1 | 8/2002 | Lang et al. | |

(Continued)

OTHER PUBLICATIONS

Raghuram M. Sreenath, Munindar P. Singh, Agent-based service selection, Web Semantics:Science, Services and Agents on the World Wide Web 1 (2004) 261-279.*

(Continued)

*Primary Examiner* — Firmin Backer
*Assistant Examiner* — Herman Belcher
(74) *Attorney, Agent, or Firm* — Nixon & Vanderhye P.C.

(57) ABSTRACT

A peer-to-peer network operating in accordance with a service-oriented architecture is disclosed. The peers in the network request services from one another and each keeps a record of the quality of service they receive from the other peers. The peers share quality of service information with one another in order to take advantage of the improvement in the overall efficiency of the use of resources in the network offered by such information sharing. However, the invention provides a further improvement in that peers do not report the quality of service offered by the peers they have received the best quality of service from. This is found to increase the overall level of service still further since it prevents the peers converging on a favorite service provider and thereby overloading it. The invention finds particular application in distributed applications which dynamically select a Web Service to perform a function at run-time.

10 Claims, 11 Drawing Sheets

U.S. PATENT DOCUMENTS

| | | | |
|---|---|---|---|
| 2002/0152190 | A1 | 10/2002 | Biebesheimer |
| 2002/0188589 | A1 | 12/2002 | Salmenkaita et al. |
| 2003/0152034 | A1 | 8/2003 | Zhang et al. |
| 2003/0182421 | A1* | 9/2003 | Faybishenko et al. ........ 709/224 |
| 2003/0195981 | A1 | 10/2003 | Graf |
| 2003/0204602 | A1* | 10/2003 | Hudson et al. ................. 709/228 |
| 2003/0208621 | A1* | 11/2003 | Bowman ....................... 709/242 |
| 2004/0098503 | A1 | 5/2004 | Zhang et al. |
| 2004/0215602 | A1 | 10/2004 | Cioccarelli |
| 2005/0060365 | A1 | 3/2005 | Robinson et al. |
| 2005/0080858 | A1 | 4/2005 | Pessach |
| 2005/0128944 | A1 | 6/2005 | Zhang et al. |
| 2005/0243797 | A1 | 11/2005 | Schrodi |
| 2006/0209701 | A1 | 9/2006 | Zhang et al. |
| 2007/0002821 | A1 | 1/2007 | Carlson et al. |
| 2007/0016573 | A1* | 1/2007 | Nanavati et al. .................. 707/5 |
| 2007/0179791 | A1 | 8/2007 | Ramesh et al. |
| 2007/0179980 | A1 | 8/2007 | Liu et al. |
| 2008/0043634 | A1 | 2/2008 | Wang et al. |
| 2009/0254654 | A1 | 10/2009 | Jakob et al. |
| 2010/0011103 | A1 | 1/2010 | Luzzatti et al. |

OTHER PUBLICATIONS

Sepandar et al., "The Eigentrust Algorithm for Reputation Management in P2P Networks", 12th International World Wide Web Conference 2003, May 20, 2003, Budapest, Hungary.

Julian Day, "Selecting the Best Web Service", 14th Annual IBM Centers of for Advanced Studies Conference, 2004, XP002407853, Retrieved from the internet: http://citeseer.ist.pus.edu/7018012.htm.

Fernandes et al., "Dynamic Inovacation of Replicated Web Services", Webmedia and La-Web, 200., Proceedings Riebeirao Preto-SP, Brazil Oct. 12-15, 2004, Piscataway, NJ, USA, IEEE, pp. 22-29, XP010734853.

Kalepu et al., "Verity: a Qos Metric for Selecting Web Services and Providers" Web information system engineering workshops, 2003. Proceedings. Fourth International Conference on Rome, Italy Dec. 13, 2003, Piscataway, NJ, USA, IEEE, 2003, pp. 131-139, XP010697498.

International Search Report for PCT/GB2007/002007, mailed Jan. 9, 2008.

PCT Written Opinion and International Search Report dated Aug. 22, 2005.

Babaoglu et al., "Anthill: A Framework for the Development of Agent-Based Peer-to-Peer Systems", Proceedings of the 22nd. International Conference on Distributed Computing Systems, ICDCS 2002, Vienna, Austria, Jul. 2-5, 2002, International Conference on Distributed Computing Systems, Los Alamitos, CA, IEEE Comp. Soc. US, vol. Conf. 22, Jul. 2, 2002, pp. 11-18.

Robinson et al., "A Complex Systems Approach to Service Discovery", Database and Expert Systems Applications, 2004, Proceedings, 15th International Workshop on Zaragoza, Spain Aug. 30-Sep. 3, 2004, Piscataway, NJ, USA, IEEE Aug. 30, 2004, pp. 657-661.

Qin et al., "Search and Replication in Unstructured Peer-to-Peer Networks", Conference Proceedings of the 2002 International Conference on Supercomputing, ICS'02, New York, NY, Jun. 22-26, 2002, ACM International Conference on Supercomputing, New York, NY:ACM, US, vol. Conf, 16, Jun. 22, 2002, pp. 84-95.

U.S. Appl. No. 12/302,937, Jakob et al., filed Dec. 1, 2008.

S. Marti, "Limited Reputation Sharing in P2P Systems" 5th ACM Conference on Electronic Commerce, May 17, 2004, New York, retrieved from the internet: URL:http://citeseer.ist.psu.edu/garcia04limited.html>.

Birrell et al., 'Implementing Remote Procedure Calls', ACM Transactions on Computer Systems, vol. 2, No. 1, Feb. 1984, pp. 39-59.

J. Day et al., "Selecting the Best Web Service" presented at the 14th Annual IBM Centers for Advanced Studies Conference, 2004.

Le-Hung Vu et al., "QoS-based Service Selection and Ranking with Trust and Reputation Management", 2005.

S. Kamvar et al., "Eigenrep: Reputation management in p2p networks", Twelfth International World Wide Web Conference, 2003.

European Search Report issued for European Patent Application No. EP 06 25 3034, dated Dec. 4, 2006.

S. Kamvar et al., "The EigenTrust Algorithm for Reputatiohn Management in P2P Networks", Twelfth International World Wide Web Conference, 2003, XP-002407852.

S. Marti et al., "Limited Reputation Sharing in P2P Systems", Fifth ACM Conference on Electronic Commerce, May 17, 2004-May 20, 2004, XP-002408215.

J. Fernandes da Silva et al., "Dynamic Invocation of Replicated Web Services", WebMedia and LA-Web 2004 Joint Conference Tenth Brazilian Symposium on Multimedia and the Web Second Latin American Web Congress, 2004, Proceedings Ribeirao Preto-SP, Brazil Oct. 12, 2004-Oct. 14, 2004.

S. Kalepu et al., "Verity: A QoS Metric for Selecting Web Services and Providers", Web Information Systems Engineering Workshops, 2003, Proceedings of the Fourth International Conference on Web Information Systems Engineering Workshops, IEEE, 2004.

Yolum et al. "Engineering Self-Organizing Referral Networks for Trustworthy Service Selection," IEEE Transactions on Systems, Man and Cybernetics, Part A: Systems and Humans, vol. 35, No. 3, pp. 396-407, May 2005.

Benchaphon Limthanmaphon et al., "Web Service Composition With Case-Based Reasoning," Proceedings of the 14th Australian Database Conference, 2003—vol. 17 (ADC 2003) Adelaide, Australia, Conferences in Research and Practice in Information Technology, vol. 17, pp. 201-208.

Ghader et al., "Service Management Platform for Personal Networks," 14th Mobile & Wireless Communications Summit, Jun. 19-23, 2005, retrieved from http://www.eurasip.org/Proceedings/Ext/IST05/papers/533.pdf.

Benatallah et al., "Definition and Execution of Composite Web Services: The SELF-SERV Project," Bulletin of the Technical Committee on Data Engineering, Dec. 2002 vol. 25 No. 4, IEEE Computer Society, pp. 47-52.

May, "Loss-Free Handover for IP Datacast Over DVB-H Networks," Inst. For Commun. Technol., Technische Univ. Braunschweig, Germany; Consumer Electronics, 2005 (ISCE 2005), Proceedings of the Ninth International Symposium; Publication Date: Jun. 14-16, 2005; pp. 203-208.

Capra et al., "Q-CAD: QoS and Context Aware Discovery Framework for Adaptive Mobile Systems," ICPS '05. Proceedings. International Conference on Pervasive Services, Jul. 11, 2005-Jul. 14, 2005, pp. 1-10, retrieved from http://www.cs.ucl.ac.uk/staff/l.capra/publications/icps05ex.pdf.

Christos et al., "Efficient and Adaptive Discovery Techniques of Web Services Handling Large Data Sets," The Journal of Systems and Software, vol. 79, (Apr. 2006), 480-495.

Wang et al., "Service Selection in Dynamic Demand-Driven Web Services," Proceedings of the IEEE International Conference on Web Services (ICWS '04) Jul. 6, 2004-Jul. 9, 2004.

Aha et al., "Instance-Based Learning Algorithms," Machine Learning (Historical Archive), vol. 6, No. 1, Jan. 1991, pp. 37-66.

Cover et al., "Nearest Neighbor Pattern Classification," IEEE Transactions on Information Theory, vol. 13, No. 1, Jan. 1967, pp. 21-27.

Huhns et al., "Service-Oriented Computing: Key Concepts and Principles," IEEE Internet Computing, vol. 9, No. 1, Jan./Feb. 2005, pp. 75-81.

Jakob et al., "Nexus—Middleware for Decentralized Service-Oriented Information Fusion," Proceedings of Specialists' Meeting on Information Fusion for Command Support, The Hague, Nov. 2005, pp. 1-8.

Benatallah et al., "The Self-Serv Environment for Web Services Composition," IEEE Internet Computing, Jan./Feb. 2003, vol. 7, Issue 1, pp. 40-48.

Dong et al., "Similarity Search for Web Services," Proceedings of the 30th VLDB Conference, Toronto, Canada, 2004, pp. 372-383.

Menasce et al., "A Framework for QoS-Aware Software Components," Proceedings of the Fourth International Workshop on Software and Performance—WOSP 2004, USA, Jan. 14-16, 2004, pp. 186-196.

Maximilien et al., "Toward Autonomic Web Services Trust and Selection," Second International Conference on Service-Oriented Computing—ICSOC, Nov. 15-19, 2004, New York, USA, pp. 212-221.

Saffre et al., "SelfService: A Theoretical Protocol for Autonomic Distribution of Services in P2P Communities," Proceedings of the 12th IEEE International Conference and Workshops on the Engineering of Computer-Based Systems (ECBS'05): IEEE 2005, pp. 528-534.

Fatih Emekci; Sahin, O.D.; Divyakant Agrawal; Amr El Abbadi; , "A peer-to-peer framework for Web service discovery with ranking," *Web Services, 2004. Proceedings. IEEE International Conference on* , vol., No., pp. 192-199, Jul. 6-9, 2004.

Chun-Lung Huang; Chi-Chun Lo; Yinsheng Li; Kuo-Ming Chao; Jen-Yao Chung; Ying Huang; , "Service discovery through multi-agent consensus," *Service-Oriented System Engineering, 2005. SOSE 2005. IEEE International Workshop* , vol., No., pp. 37-44, Oct. 20-21, 2005.

E. Michael Maximilien et al, "Multiagent System for Dynamic Web Services Selection", Proceedings of 1st Workshop on Service-Oriented Computing and Agent-Based Engineering (SOCABE at AAMAS), 2005, pp. 25-29.

Massimo Paolucci, Katia Sycara, "Autonomous Semantic Web Services", IEEE Internet Computing, vol. 7 Issue 5, Sep. 2003.

Le-Hung Vu, Manfred Hauswirth, Karl Aberer; *Towards P2P-Based Semantic Web Service Discovery with QoS Support.* In Proceedings of Business Process Management Workshops 2005. pp. 18-31.

Liangzhao Zeng; Benatallah, B.; Ngu, A.H.H.; Dumas, M.; Kalagnanam, J.; Chang, H.; , "QoS-aware middleware for Web services composition," *Software Engineering, IEEE Transactions on* , vol. 30, No. 5, pp. 311-327, May 2004.

Michal Jakob; Alex Healing; Fabrice Saffre; "Mercury: Multi-Agent Adaptive Service Selection Based on Non-Functional Attribures"; Proceedings of the 2005 IEEE International Workshop on Service-Oriented System Engineering (SOSE '05); 2005, 10 pgs.

International Search Report for PCT/GB2007/002038, mailed, Sep. 24, 2007.

Sepandar et al., "The Eigentrust Algorithm for Reputation Management in P2P Networks", 12th International World Wide Web Conference, May 20, 2003, XP002407852. Retrieved from the Internet: http://citeseer.ist.pus.edu/cache/pape.

Julian Day, "Selecting the Best Web Service", 14th Annual IBM Centers of for Advanced Studies Conference, 2004, XP002407853, Retrieved from the Internet: http://citeseer.ist.pus.edu/7018012.htm.

Wang et al., "Service Selection in Dynamic Demand-Driven Web Services", Web Services, 2004. Proceedings. IEEE International Conference on San Diego, CA, USA, Jul. 6-9, 2004, Piscataway NJ, USA, IEEE, pp. 376-384, XP010708869.

Makris et al., "Efficient and Adaptive Discovery Techniques of Web Services Handling Large Data Sets", Journal of Systems & Software, Elsevier North Holland, New York, NY, US, vol. 79, No. 4, Apr. 2006, pp. 480-495, XP005411719.

* cited by examiner

| Quality Register Name | VS1 | |
|---|---|---|
| Service Name | Video Streaming | |
| Service Parameter 1 | Playout Rate (kbits-1) | |
| Context Parameter 1 | Network Utilisation (0 – 100%) | |
| Master Problem : Service Parameter 1 Value | | 2000 |
| Master Problem : Context Parameter 1 Value | | 40 |
| Average Local Exploration QoS | | 6.8 |
| Average Remote Exploration QoS | | 7.0 |
| Provider-Specific Summary Quality of Service Records | | |
| Provider ID | QoS Experienced | Weight |
| A | 7.2 | 1.2 |
| B | 6.1 | 8.5 |
| D | 8.0 | 7.3 |

Figure 2
(as stored in host F, for example)

| Provider-Specific Service Provision Record | Service Provider ID | Playout Rate | Network Utilisation | QoS Experienced | Exploratory / Exploitative |
|---|---|---|---|---|---|
| | 80 | 82 | 84 | 86 | 88 |

Figure 5A

| Non-Specific Service Provision Record | Playout Rate | Network Utilisation | QoS Experienced | Exploratory / Exploitative |
|---|---|---|---|---|

Figure 5B

COMPUTER NETWORK

This application is the U.S. national phase of International Application No. PCT/GB2007/002038 filed 31 May 2007 which designated the U.S. and claims priority to European Application No. 06253029.0, filed 13 Jun. 2006 the entire contents of each of which are hereby incorporated by reference.

BACKGROUND

1. Brief Description

The present invention relates to a method of operating a computer network. It has particular utility in relation to peer-to-peer networks in which peers provide services to one another.

2. Description of Related Art

Until recently, the World-Wide Web has largely been used for providing information or content to users. However, the proportion of web-servers offering processing in addition to information is growing. The services offered in this way to the developers of distributed application programs must have defined interfaces so that the developers can program the computer they are programming to call upon the web server to execute a process remotely. This sort of remote execution is well known and was first developed in the form of remote procedure calls (RPC), a more flexible framework then being provided by the Common Object Request Broker Architecture (CORBA), and an even more flexible framework then being provided in the form of Web Services.

The selection of a web-service to form part of a distributed application program is often made by the programmer at design-time (i.e. the programmer hard codes the identity of the service provider in the code he generates). However, in scenarios where the network or the services providers are unstable, this is inflexible. Hence, it is known to provide code which causes the computer requesting the service to decide upon a service provider at run-time. Indeed, 'late-binding' like this is seen in Birrell and Nelson's seminal paper 'Implementing Remote Procedure Calls', ACM Transactions on Computer Systems, Vol. 2, No. 1, February 1984, Pages 39-59.

One type of such dynamic service selection utilises clients' past experiences of the quality of service provided by different servers. In many implementations, data representing past experiences are shared by each client with other clients. Often, this sharing is achieved by having each client post data representing its experience to a shared database accessible to other clients.

J. Day and R. Deters' paper "Selecting the Best Web Service" presented at the 14$^{th}$ Annual IBM Centers for Advanced Studies Conference, 2004 presents two methods by which a client may 'reason' about which service provider to select. One is a rule-based expert system, the other a naïve Bayes reasoner. The downside of deterministic service selection based on shared rankings—namely that the highest ranked service provider tends to be overloaded is recognised. The problem is said to be better dealt with by service selection using the naïve Bayes reasoner, since this classifies services into groups, one member from the group being chosen at random—this introducing a more probabilistic service selection which avoids overloading the highest-ranked provider. The possibility of distributing the performance data in a peer-to-peer like system is mentioned towards the end of the paper. Le-Hung Vu et al in "QoS-based Service Selection and Ranking with Trust and Reputation Management", suggest that distributing performance data is 'a bit unrealistic as each service consumer would have to take the heavy processing role of a discovery and reputation system'.

A similar problem is found in peer-to-peer networks which rely on reputation management to overcome the detrimental influence of malign peers. S. Kamvar, M. Schlosser, and H. Garcia-Molina's paper "*Eigenrep: Reputation management in p2p networks*", Twelfth International World Wide Web Conference, 2003 proposes a two-fold approach to the problem:

i) with a one-in-ten probability, to try, at random, a peer which has not yet been tried; and, in the other nine-out-of-ten cases ii) to make the service provider selection of each client probabilistic rather than deterministic—though the probability of selection is still higher the higher the ranking of the provider.

In both cases, the solution can be seen to be to move from a deterministic service selection to a more probabilistic selection. For obvious reasons, neither proposes truly random selection since this would obviate the advantage of sharing quality-of-service (QoS) information in the first place.

BRIEF SUMMARY

The present inventors have realised that this problem of resource-overloading can be tackled in a different way which tends to provide a better average quality of service in the operation of the peer-to-peer network.

According to the present invention, there is provided a computer network comprising a plurality of devices interconnected via communication links, each of said devices storing a quality of service register containing information on the quality of service provided by other devices in said network, each of said devices being arranged in operation to respond to a service request by:

selecting one of said other devices to provide the requested service;

requesting the selected device to provide said service;

monitoring the quality of service provided in response to said request;

updating said quality of service register in response to said monitored quality of service; and updating the quality of service register in other devices by reporting at least some of said quality of service experiences to them;

wherein said provider selection whilst being made in dependence on said quality of service register has a probabilistic element resulting in the occasional selection of a service provider other than the highest-ranked service provider in said quality of service register; said method further comprising:

for each service request, comparing said monitored quality of service with said quality of service records, and reporting quality of service experiences relating to the higher-ranked service providers according to said quality of service records less thoroughly than those quality of service experiences relating to lower-ranked service providers.

In a peer-to-peer network in which each peer maintains a model of the quality-of-service provided by other peers in the network, and selects other peers to provide a service in dependence on that model, arranging each peer to report less thoroughly service experiences which relate to the service provider which the requesting peer would itself select if making a fully-deterministic choice of service provider, has the advantage of making it less likely that all peers will converge on a single peer for service provision thereby adversely affecting the quality of service that peer can provide, and thereby lowering the overall level of service in the peer-to-peer network. Having a probabilistic element in service selection is in any case beneficial in allowing the network to adapt to changes in the peer-to-peer network.

Less thorough reporting can take the form of sending less reports (i.e. reporting only a subset of quality-of-service experiences) or sending less informative reports (e.g. not providing the identity of the service provider).

BRIEF DESCRIPTION OF THE DRAWINGS

There now follows a description, given by way of example only, of specific embodiments of the present invention, which refers to the accompanying drawings in which:

FIG. 2 shows an example of a data structure stored in nodes of the service-oriented computer network;

FIGS. 5A and 5B illustrate the format of QoS report sent by each client computer in the network;

DETAILED DESCRIPTION OF EXAMPLE EMBODIMENTS

Figure 1:
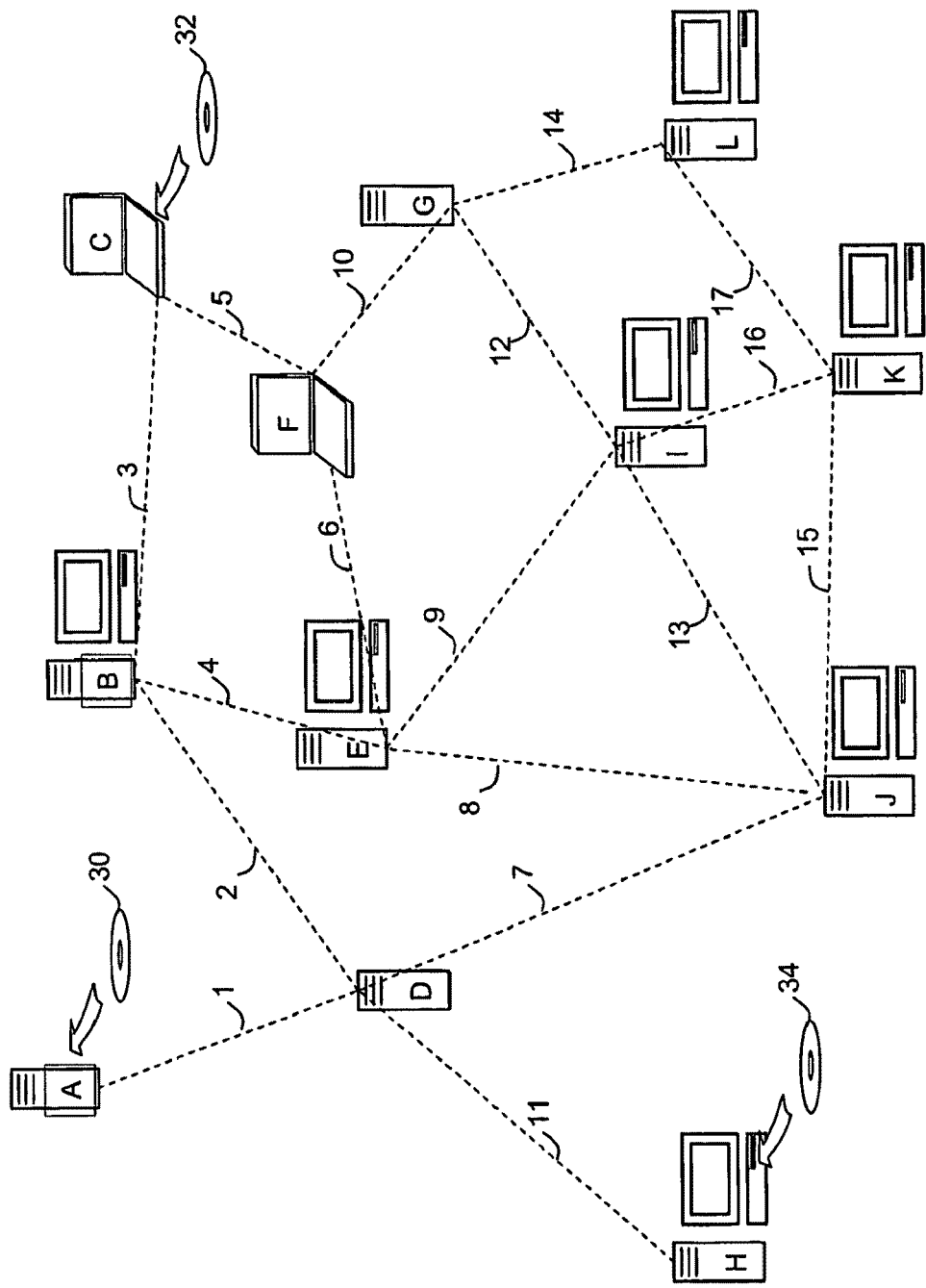
FIG. 1 shows a service-oriented computer network overlaid on the Internet.

A computer network (FIG. 1) comprises a plurality of devices (A-L) which able to communicate via links (1-17). The devices are of different types including desktop computers (B, E, H, I, J, K, and L), laptop computers (C and F), and server computers (A, D and G). Each of these computers is supplied with conventional hardware and operating system software which enables them to run application programs and communicate with each other via the Internet. Also installed on each of the computers is middleware which enables the computers both to overlay an application-level network on the Internet, to provide services to other computers on the network and to find and execute services on other computers in the network. An example of suitable middleware is NEXUS middleware as described in the paper 'NEXUS—resilient intelligent middleware' by Nima Kaveh and Robert Ghanea-Hercock published in BT Technology Journal, vol. 22 no. 3, July 2004 pp 209-215—the entire contents of which are hereby incorporated by reference.

Alternatively, commercially available middleware such as IBM's WebSphere or BEA's WebLogic could be used.

Each of the server computers (A, D and G) has a hard disk or disk array which stores a plurality of video files, together with software for advertising the video service available to client computers in the network using the middleware. In addition each server computer has a multi-rate video file playout program which, in response to a request from a client computer, can stream a video file to that client computer at one of a plurality of advertised playout rates (lower rates being consequent on the server playing out a more highly-compressed file). This programs are loaded into the server computers (A, D, and G) from CD-ROM 30.

Each of the client computers (C and F) has client software installed upon it which is executable to select a server computer to provide it with a streamed video file, and thereafter to cause the server computer to stream the video file to the client computer. The selection software takes the form of a selector agent program which maintains data structures which record the quality of service received from various server computers in the network and sends QoS reports to other client computers in the network. The software for the client computers is loaded from CD-ROM 32.

The desktop computers (B, E, H, I, J, K, and L) are provided with both the client software and the server software and hence are able to display streamed video to their users and also able to stream video files to other computers in the network. Both sets of software are installed on the desktop computers from CD-ROM 34.

A data structure created and updated by the client software is illustrated in FIG. 2. The data structure is referred to as a 'quality register' and records information about the quality of the service experienced from server computers in the network. As will be explained below, a single service selector agent might create and update a plurality of quality registers which all relate to the same service.

Hence, each quality register (FIG. 2) has both a 'Name' field 40 and a 'Service Name' field 42.

These two fields are followed by one or more service parameter fields 44 which indicate parameters which specify to the server computer the task to be carried out. In the present example, the service parameters include the playout rate, a parameter which, in effect, tells the server computer the degree of compression applied to the video. As will be understood by those skilled in the art, this service parameter and other service parameters will be written in an agreed interface language (should Web Services middleware be used, then the interface language would be Web Services Description Language (WSDL)).

The next field(s) in the quality register are one or more context parameters 46. These parameters relate to external conditions which might affect the quality of the service being delivered. In the present example, the context parameters include network utilisation. The selector agent is able to obtain this context parameter from a Web Service which reports the level of utilisation of the Internet in the region of the overlay network (FIG. 1).

The next two fields 48, 50 hold different values in each of the quality registers relating to the same service. The two fields give specific values for the one or more service parameters 44 and one or more context parameters 46 which define a 'master problem'—that is to say a specific set of parameters which define a particular service provision problem. In the present case, for example, the master problem relates to provision of the video streaming service where the requested playout rate is 2000 kbits$^{-1}$, at a time when the network utilisation is 40%.

As was mentioned above, the selector agent keeps track of the quality of video streaming service (and other services, not described here—but the principle of operation is the same) experienced by its host. For any given service, a plurality of quality registers like those shown in FIG. 2 might be created and maintained. Separate quality registers are created where necessary to reflect differences in the relationship between parameters and quality-of-service which occur for different ranges of parameters.

The next two fields in the quality register are average local exploration QoS 52 and average remote exploration QoS 54. Both are initialised to zero. The first of these gives an indication of the level of service experienced when the device storing the quality register, having been faced with a task similar to the quality register's master problem, has selected a service provider speculatively—i.e. has selected a service provider in a way not determined by its prior experience of quality of service received from available service providers. The second field is a similar measure but is built up from the experiences of speculative selection reported by other service providers.

The data structure then ends with a list of provider-specific summary quality of service records 56, one for each service provider that has previously provided service to the node. Each includes an indication of the service provider to which it relates (first column), a summary measure of the QoS experienced from that provider (second column) and a weight (third column) to be applied to the summary measure. As will be explained with reference to FIGS. 6 and 11 below the weight attached to the QoS value depends on the number of experiences on which the QoS value is based and the recency of those experiences.

The service parameters (just playout rate in this case) and context parameters (just network utilisation in this case) can be thought of as the two co-ordinate axes of a two-dimensional 'problem space'. Each instance of service provision, and each quality register's master problem can be seen as a point in that two-dimensional problem space. Hence, for the illustrative examples given in FIG. 2, the master problem can be seen to be located at position VS1 in the problem space illustrated in FIG. 3.

In the present embodiment, each quality register takes account of and summarises examples of instances of service provision which are sufficiently similar to the master problem which characterises the quality register. The required degree of similarity is defined in this case as within a threshold Euclidean distance of the master problem. That Euclidean distance is calculated in the present case as:

$$Distance = sqrt((80*(network\ utilisation - 40))^2 + (playout\ rate - 2000)^2)).$$

Figure 3:
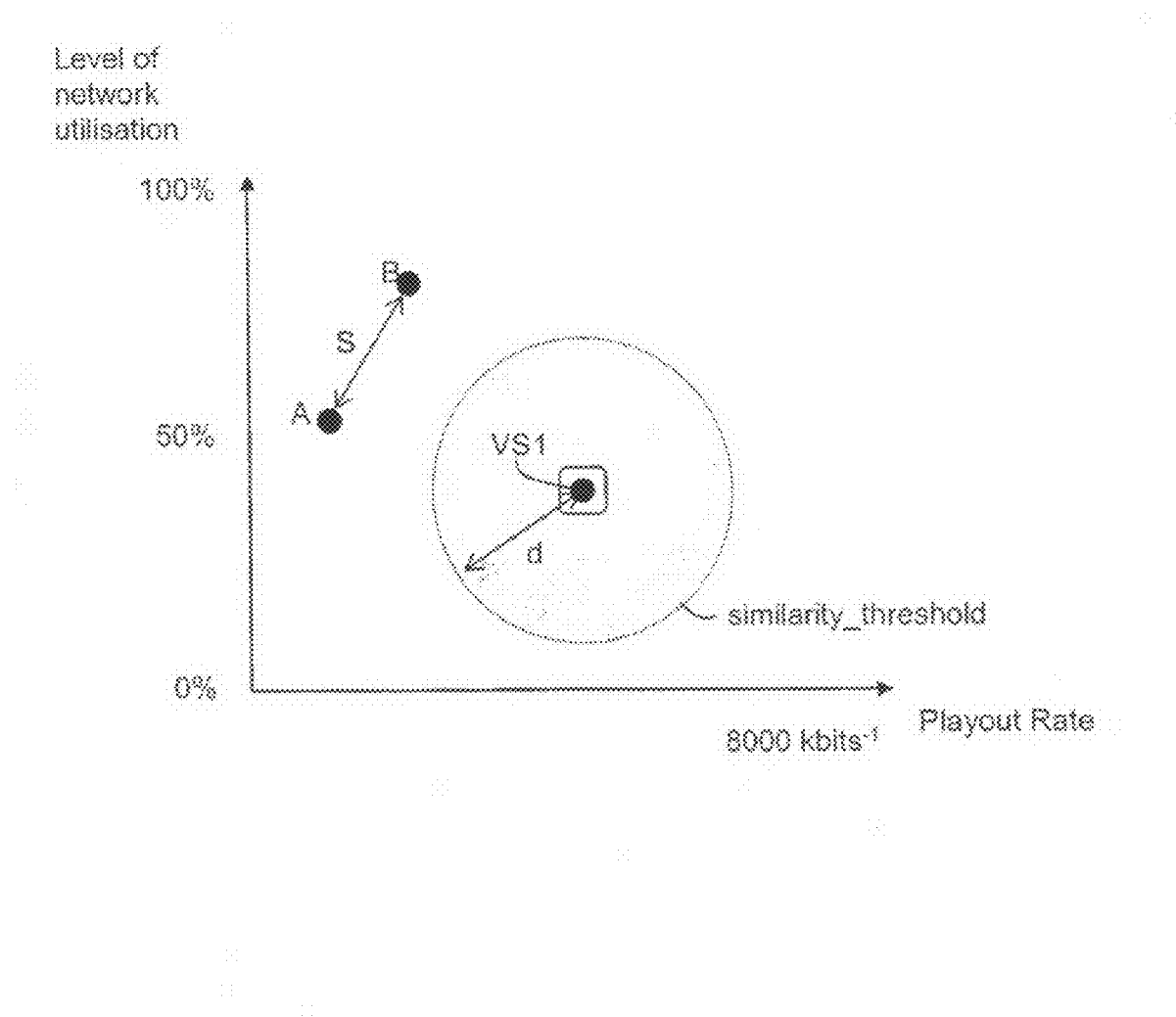
FIG. 3 illustrates parameters which characterise instances of service provision by computers in said service-oriented computer network.

It will be realised that the 80 factor is required to make the area of the problem space covered by the quality register VS1 appear as a circle in FIG. 3. It will also be realised that 2000 and 40 are the co-ordinates of the master problem in the problem space. In practice the relative importance of each dimension could be made different by changing the factor—thereby emphasising parameters which are particularly significant in determining how 'similar' one instance of service provision is to another.

Similarly, the Euclidean distance S between service provision instances A and B could be calculated as:

$$S = sqrt((80(A_N - B_N))^2 + (A_P - B_P)^2)$$

where $A_P$, $A_N$ and $B_P$, $B_N$ are the co-ordinates of the service provision instances A and B in the problem space—in other words, $A_P$ is the network ultilisation of the network at the time of service provision instance A etc.

Figure 4:
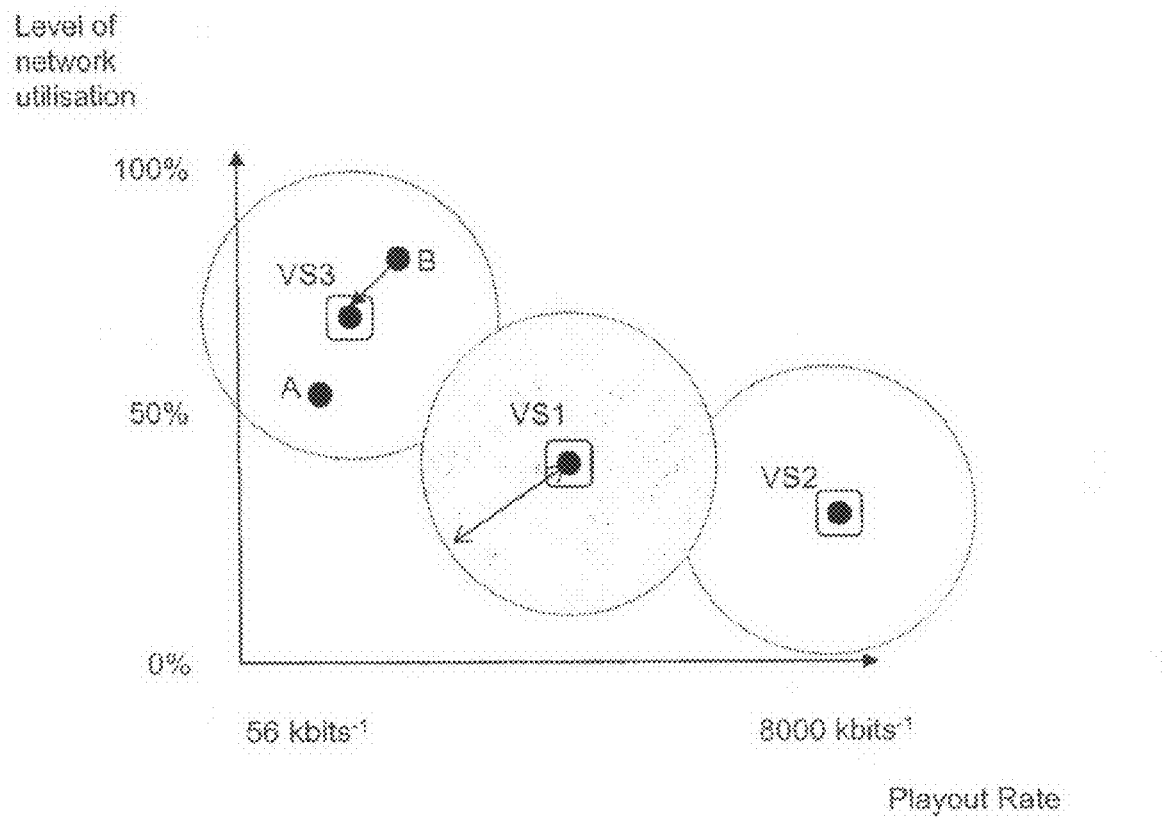
FIG. 4 illustrates how those characteristic parameters can be organised into clusters.

In this preferred embodiment, three master problems, VS1, VS2 and VS3 are defined in the problem space (FIG. 4). Each encompasses one or more service provision instances. The use of a plurality of quality registers allows regions in the problem space where the relationship between QoS, playout rate and network utilisation differs to be dealt with separately and therefore enables better usage of the resources of the network than might be achieved should a single list of all service experiences be maintained by each node. To give an example, some providers might deliver highly-compressed streams while others focus on image quality and use correspondingly lower compression. When network bandwidth is limited and required playback rate is high, high-compression providers will deliver higher QoS And vice versa, when bandwidth is abundant, quality-oriented providers running quality-optimized algorithms (e.g. MPEG2) would deliver better QoS. So depending on network conditions and required playback rate, ordering of providers with respect to the QoS differs. If only a single quality register was used, the selection function could not reflect the specialization of providers, their quality records would "average out" and the average QoS delivered would be lower than if specialization is captured and exploited.

Figure 11:
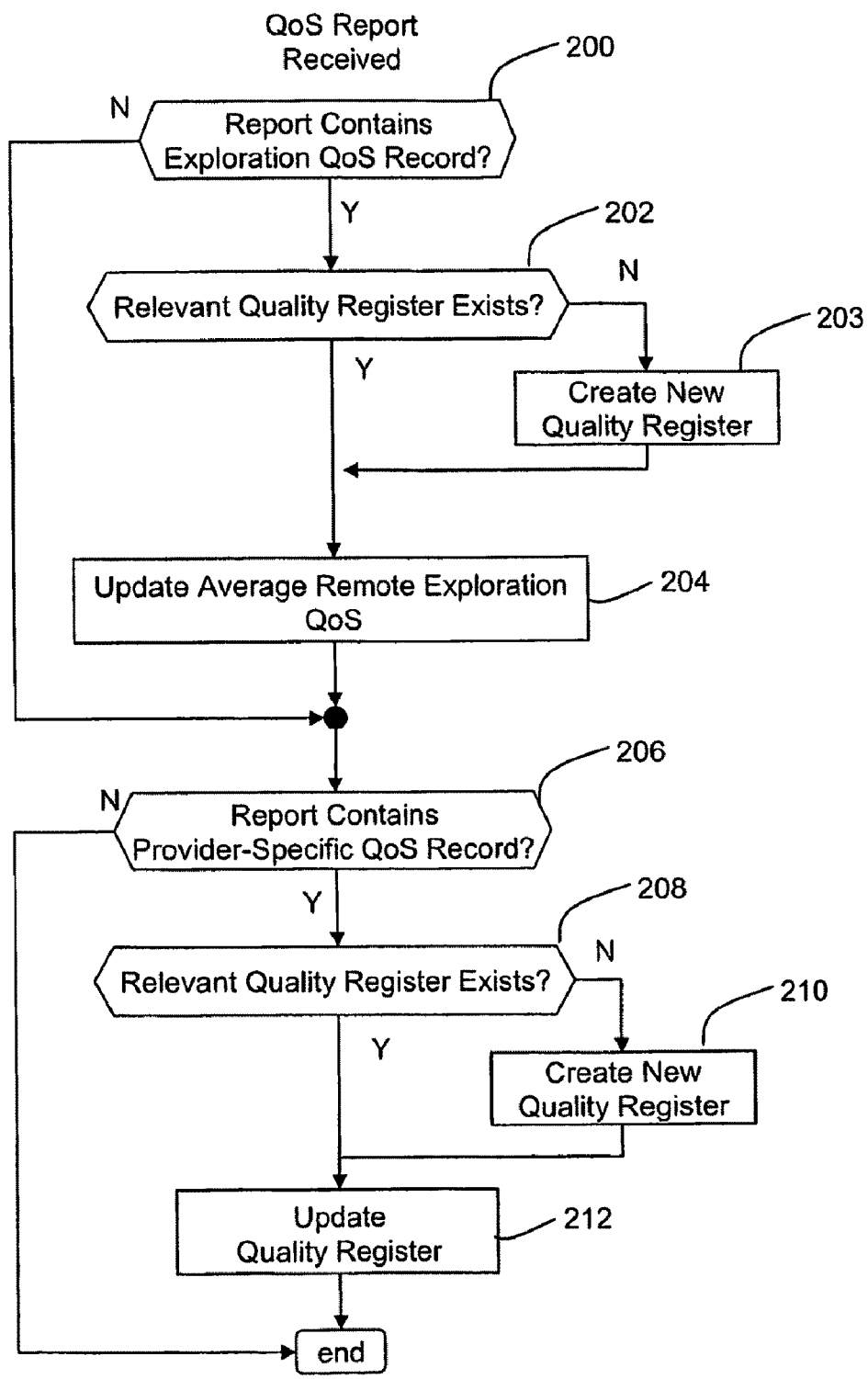
FIG. 11 is a flow-chart illustrating processing carried out by client computers on receiving a QoS report.

As will be explained more fully with reference to FIG. 11, a provider-specific service provision record (FIG. 5A) may be generated by a selection agent in response to receiving a service from a service provider. This record will be included in a QoS report broadcast to other computers in the overlay network.

The provider-specific service provision record lists the provider of the service 80, the playout rate and congestion level (which locate the instance of the service in the problem space), a level of service or QoS parameter 86 which is a quantitative measure of the quality of the service provided, and a flag indicating whether the client in this specific service instance was operating in an exploitative or exploratory mode (something which will be explained with reference to FIG. 8 below).

A non-specific service provision record (FIG. 5B) is sent in some cases—this contains the same fields as those seen in the full service provision record, save for lacking an indication of the provider of the service.

Figure 6:
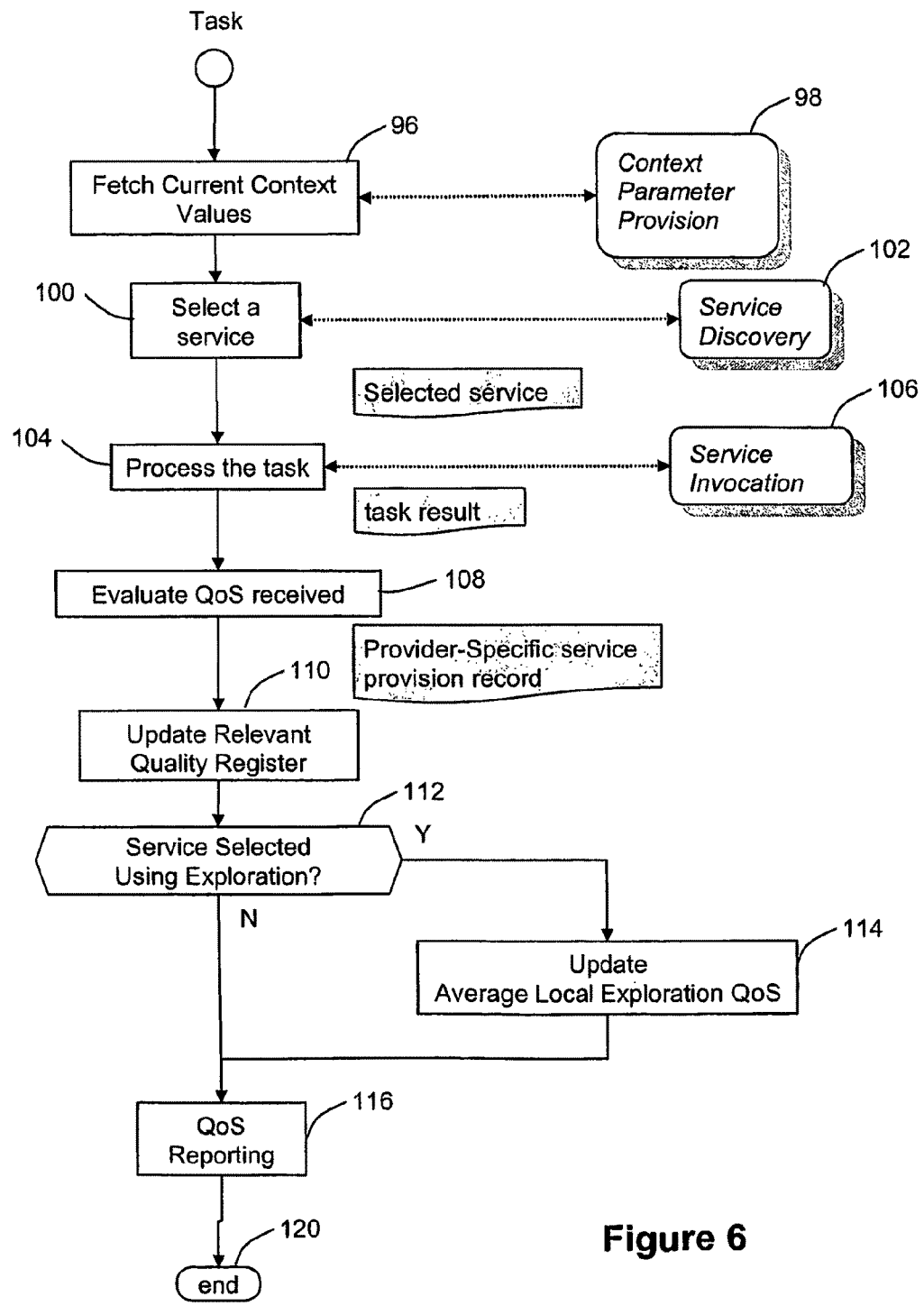
FIG. 6 is a flow-chart illustrating the operation of client computers which select, request and appraise one or more services provider by server computers in the network.

In response to receiving a request from its user for the provision of a streamed video, each client computer carries out the steps shown in FIG. 6. The request will specify one or more service parameters (playout rate has been explicitly described, but the request will obviously also have to identify the video to be streamed to the client), as well as one or more context parameters.

In the present video-streaming example, the context parameter is network utilisation. The client program begins by interrogating 96 a web service 98 to find a current value of network utilisation.

It then utilises that context parameter and the service parameter (playout rate) in selecting 100 a video streaming service provider. This selection will be described in more detail below with reference to FIGS. 7 and 8.

Having obtained details of the selected service provider, the client then processes 104 the task by invoking the video streaming service 106 on the selected service provider. More details concerning this step will be given below with reference to FIG. 7.

The video is then streamed and the client program calculates 108 a measure of the received quality of service. For a streaming video, the measure of quality might, for example, be a perception-based quality measure or a more basic measure such as response time, throughput, or accuracy.

The output of the evaluation step 108 will be a provider-specific service provision record (FIG. 5A) which is a single illustration of the relationship between QoS, one or more service parameters, and one or more context parameters.

This provider-specific service provision record will be used to update 110 the summary QoS record relating to that provider in the quality register created or selected in the service selection step 100 (this selection and creation of a quality register will be explained in relation to FIG. 8 below).

The provider-specific summary QoS record is be updated as follows:

Firstly, the weight of the record is incremented by 1

$$w^{(t+1)} = w^{(t)} + 1$$

where $w^{(t)}$ is the existing weight.

This counters a decay function which reduces the weight associated with each record over time in order to maintain the ability of the selection system to adapt to changes in the system. An exponential decay is used in the current implementation of the system.

$$w^{(t+1)} = \alpha w^{(t)}$$

$\alpha$ is given a value between 0 and 1 to control the rate at which the weight decays.

The QoS experienced value of the record is updated in accordance with the formula $$q^{(t+1)} = (1-\mu)q^{(t)} + \mu q$$

where $q^{(t)}$ is the current QoS experienced value for the service, q the value received in the cycle and $\mu$ is the adaptability calculated as the inverse of record's weight, i.e.

$$\mu = \frac{1}{w}$$

The inverse relationship between adaptability and weight ensures that quality records that are not based on a high number of service invocations and/or are not recent enough (i.e. subject to weight decay as explained above) are easier to modify than the ones based on a number of recent invocations. It addresses three needs that arise with the adaptive selection mechanism, and that cannot be addressed using a fixed adaptability update:

Firstly, the selection mechanism needs different update speeds at different times. High adaptability is required in the initial, explorative stages of a system's operation, when new information should have strong impact on existing quality records. Later, however, low adaptability is preferable as it maintains the stability of the acquired service selection function. The use of a fixed adaptability would instead result in slow convergence in the exploration phase (due to the adaptability being too low) or lead to oscillations in the exploitation phase (due to adaptability being too high).

Secondly, the amount of experience aggregated for each provider is different, and consequently each record needs a different adaptability.

Thirdly, the adaptive adaptability mechanism is very important in the case of provider overloading as it allows the selection function to converge into a stable configuration. This is because the selector that uses a particular provider most, has the highest weight for the associated record, and consequently the lowest adaptability. When another selector attempts to use the provider and thereby overloads the provider, the (temporarily) low QoS received by both providers has much higher impact on the record held by the "intruding" selector, hence discouraging it from using the provider in the near future. Thus, once a client-supplier relationship has formed, it will tend to persist.

Having updated the relevant quality register with the result of the QoS evaluation 108, a test 112 is carried out to find whether the service selection in step 100 was made using an exploration strategy. If not, then the process moves onto QoS reporting as will be described below. However, if it is found that an exploration strategy was used, then one further update to the relevant quality register is made.

The average local exploration QoS value, $Q_{explore}^{local}$ in the relevant quality register (FIG. 2; 52), is updated 114 in response to each exploratory service invocation which takes place. The updating is done in accordance with the formula:

$$Q_{explore}^{local(t+1)} = (1-\alpha)(Q_{explore}^{local(t)}) + \alpha(q_{explore}^{local})$$

Where $Q_{explore}^{local}$ represents the average local exploration QoS value and $q_{explore}^{local}$ represents the QoS value in the exploration report just received.

Figure 7:
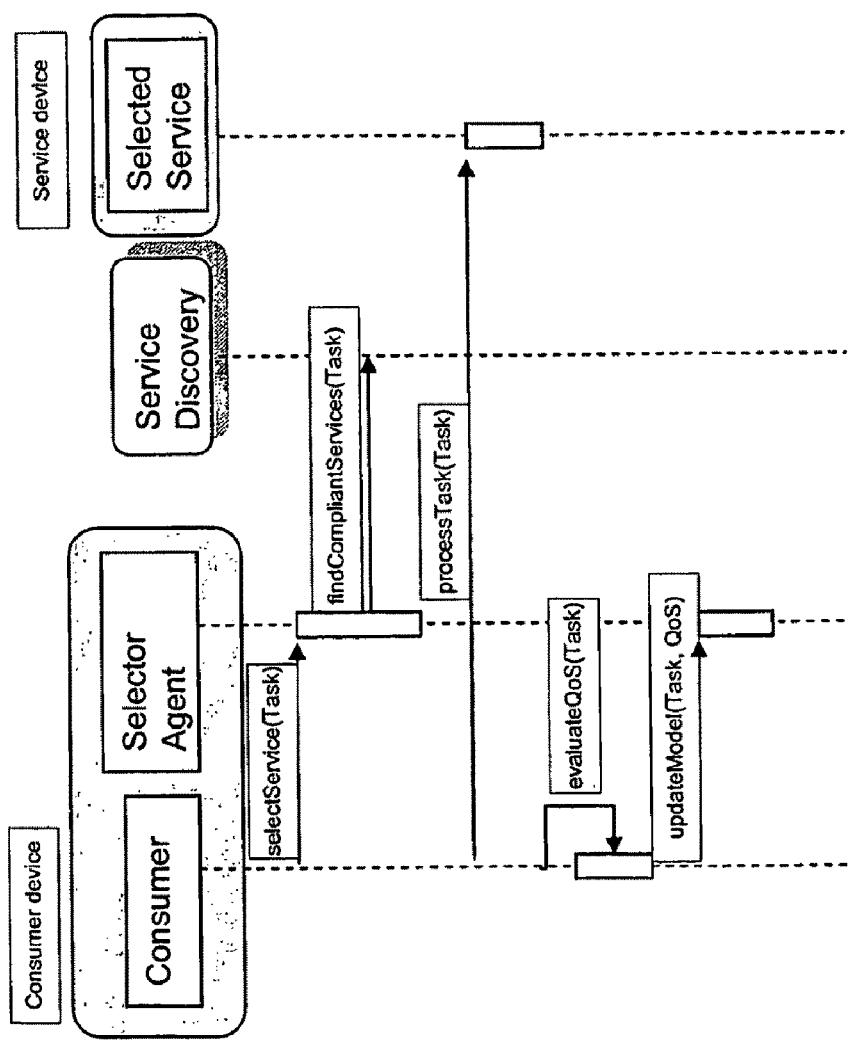
FIG. 7 illustrates the interaction of client computers and server computers.

FIG. 7 shows how the processing seen in FIG. 6 is divided between different devices and the two software modules on the client device (the retrieval of the context parameters is not shown, but it is to be understood that the values are retrieved from a context parameter provision service located on the client device which provides the context parameters to the consumer component). It will be seen that the client has a selector agent which maintains the quality registers and exploration QoS values and the like. The Consumer component on the client device sends the task request to the selector agent which then obtains a list of candidate services from a service discovery module (provided as part of the above mentioned middleware). The selector agent then makes its choice from amongst as will be explained below. Having made the selection, a call is made to the selected service to provide the video stream. The quality of the response is evaluated by the consumer, and used to update the quality register and possibly also the exploration QoS values maintained by the selector agent.

Figure 8:
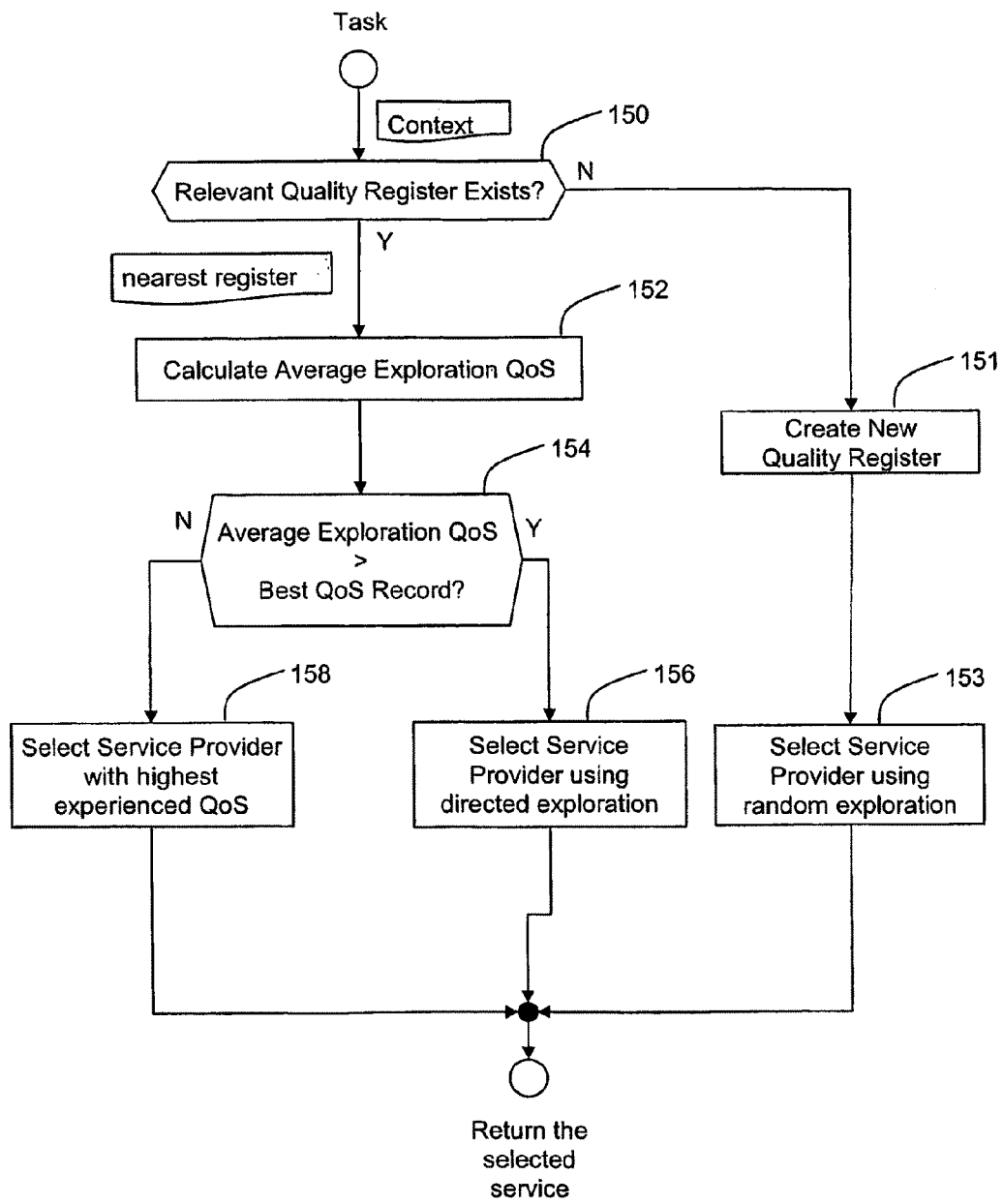
FIG. 8 illustrates the service selection procedure in more detail.

FIG. 8 shows the service selection step 100 of FIG. 6 in more detail. In response to being passed the task (an object which includes the values of the service parameters for the particular invocation), and one or more context parameters, a first test 150 finds whether a relevant quality register exists by:

i) finding the nearest quality register VS1, VS2, VS3 to the task (i.e. the quality register whose master problem is closest in problem space (FIG. 4) to the provided service and context parameters); and ii) comparing the distance between that quality register's master problem and the task to the similarity threshold.

If the distance exceeds the threshold, the a new quality register is created 151. A service provider is then selected 153 at random from the candidate service provider list generated by the service discovery mechanism. In that case, each candidate service provider is equally likely to be chosen.

If a relevant quality register is found, however, then it follows that the records in the quality register selected in step 150 are likely to be relevant to the task at hand. The process then decides whether to use:

a) a service provider which already has a QoS record 56 in the closest quality register (thereby adopting the strategy of exploiting existing QoS information); or b) a service provider chosen in a way not determined by the QoS records 56 (thereby adopting the strategy of exploring other potential service providers).

An aggregate estimate of exploration QoS used in making the decision is then calculated 152 by combining the average local exploration QoS (FIG. 2; 52) and average remote exploration QoS (FIG. 2; 54)—both found in the relevant quality register—as follows:

$$Q_{explore} = (1-\beta)(Q_{explore}^{local}) + \beta(Q_{explore}^{remote})$$

It will be remembered that the average local exploration QoS value, $Q_{explore}^{local}$ is updated following each local exploration instance (FIG. 6; 112). The average remote exploration QoS value, $Q_{explore}^{remote}$ is updated as described below in relation to FIG. 11. β is the report acceptance coefficient, reflecting how much weight the device's own experience is given in comparison to exploration reports received other devices in the network. This might, for example be set to 0.5.

This decision 154 then involves finding whether the above-calculated average exploration QoS is greater than the highest QoS value in the provider-specific QoS records 56 included in the selected quality register. If that condition is met then the process moves onto a directed exploration service selection 156. If the condition is not met, then the process adopts an exploitation strategy which simply selects 158 the service provider identified in the QoS record 56 having the highest QoS value.

Although a deterministic decision 154 was described above, in a preferred embodiment, a probabilistic choice between record-based selection (referred to as exploitation) and directed exploration is performed. The probabilistic choice is made using an adaptive exploration probability.

The exploration probability is calculated using the difference between the register's highest provider-specific summary QoS value and the estimated exploration QoS, i.e., the difference between the mean QoS expected when exploitation is pursued vs. the mean QoS expected when exploration is pursued.

Specifically, the exploration probability is calculated as follows: Firstly, expected relative (QoS) improvement is calculated as $$\hat{s}_{rel} = \frac{\hat{q}_{explore} - s_{top}}{s_{top}}$$

where $s_{top}$ is the highest QoS found in the provider-specific summary QoS records 56 included in the selected quality register, and $\hat{q}_{explore}$ is the estimated average exploration QoS (the derivation of which is explained in relation to FIG. 11 below).

The exploration probability is calculated as $$p_{explore} = \frac{1}{\left(1 + e^{-\beta \hat{s}_{rel}}\right)}$$

where β is so called exploration sensitivity. Exploitation probability is then simply $$p_{exploit} = 1 - p_{explore}$$

The decision in the second test in this alternative embodiment is then made randomly based on the probability $p_{explore}$ thus calculated.

Whatever form the second test 152 takes, a decision to adopt the exploration strategy results in a service selection process which uses directed exploitation 156. A decision to adopt the exploitation strategy results in the best service provider according to the selected quality register being selected 158.

Directed exploration is arranged such that the likelihood of a candidate service provider being selected is lower for those candidate service providers about which the quality register has most reliable QoS information.

This is achieved by calculating a priority value—here denoted $r_i$—for each service provider (it is possible that any service provider might be chosen including those which already have QoS values in the quality register) as follows.

$$r_i = \frac{1}{(1 + w_i)^\gamma}$$

where $w_i$ is the weight of the register's record corresponding to service i, and γ is the exploration novelty preference. The weight $w_i$ is set to zero if the service does not have a corresponding record in the register.

The probability $p_i$ that service i will be selected for exploration is then calculated as:

$$p_i = \frac{r_i}{\sum r_i}$$

Figure 9:
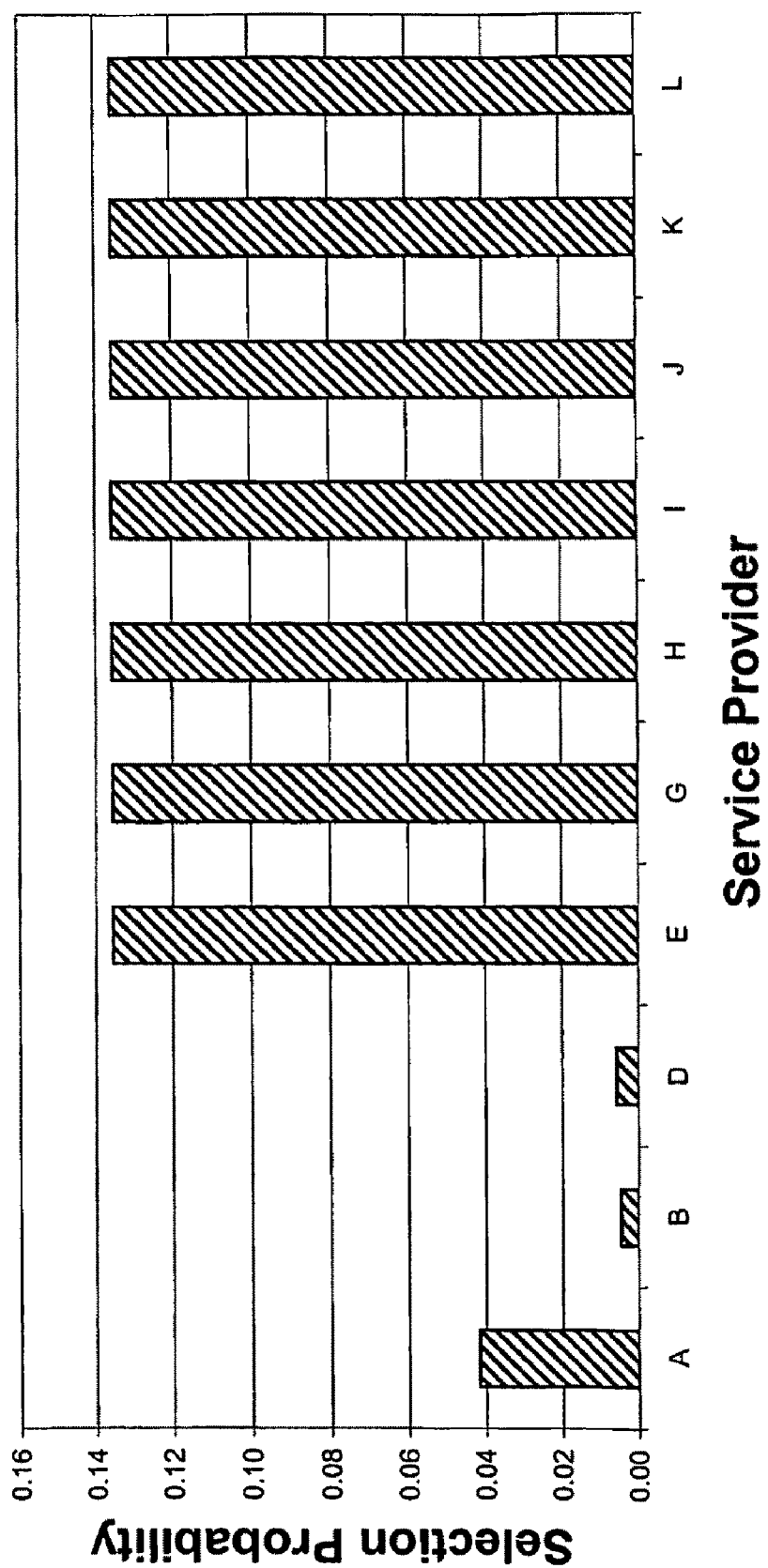
FIG. 9 illustrates selection data used in one type of service selection procedure.

FIG. 9 shows the probabilities of selection calculated in this way for the quality register values seen in FIG. 2. It will be seen that it is considerably more likely that an untried service provider will be selected. Of the already tried service providers, A is the most likely to be selected since the QoS record associated with A has a low weight associated with it.

Figure 10:
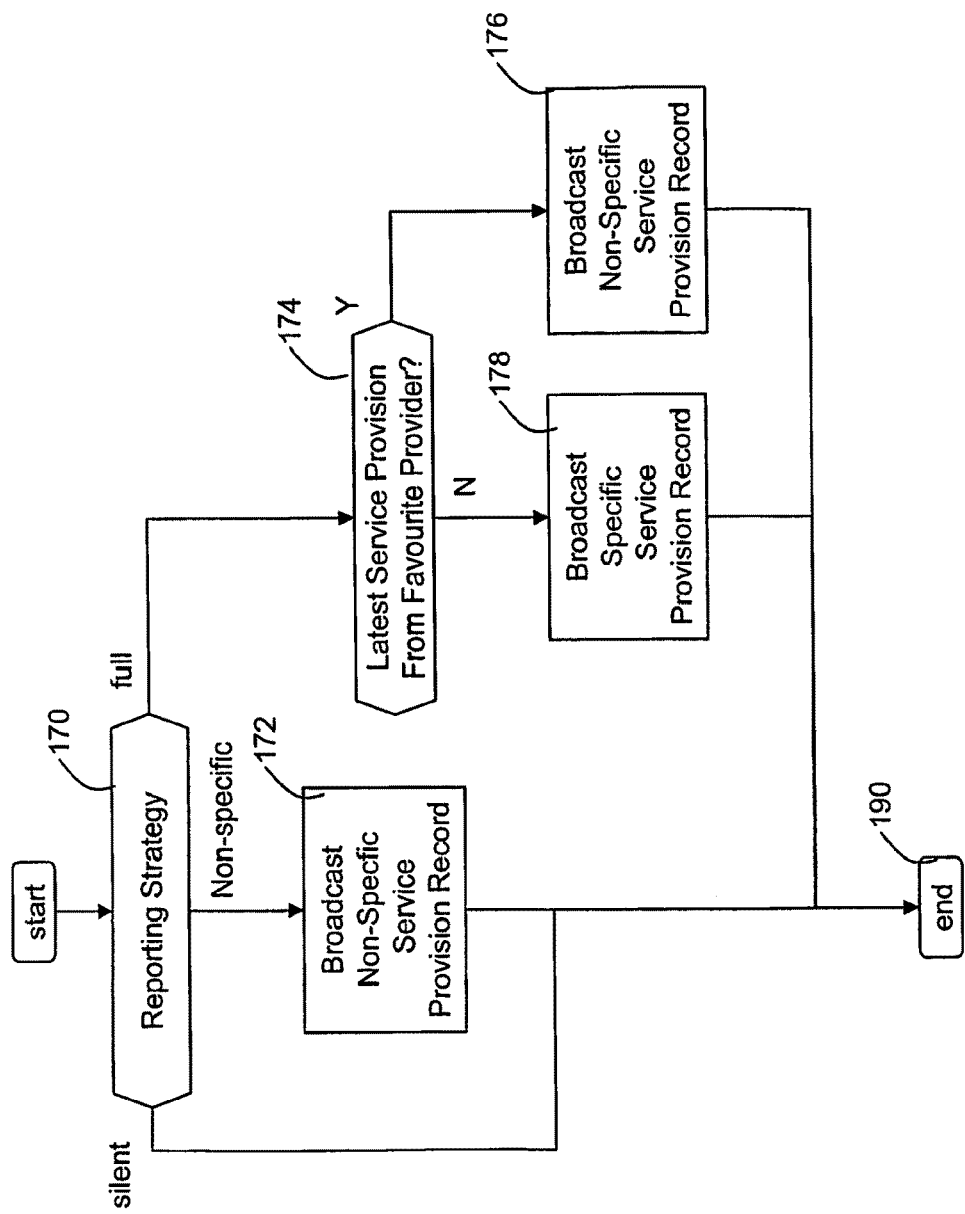
FIG. 10 is a flow-chart illustrating the method client computers use to inform other computers in the network of the level of service they have experienced.

The QoS Reporting process (FIG. 6, 116) will now be described in more detail with reference to FIG. 10.

Reporting enables faster convergence and consequently results in a higher average QoS in the network, particularly in situations when the availability of services or their performance varies.

Selectors share experience of providers by exchanging QoS reports containing one (or in alternative embodiments more than one) service provision records (FIGS. 5A and 5B).

Each client can adopt one of three reporting strategies—which strategy is adopted is configurable by the device user or a network administrator. In preferred embodiments all the devices in the network adopt a full reporting strategy.

silent: no QoS reports are sent by the device
  non-specific reporting: non-specific service records (FIG. 5B) are sent. These enable selectors which receive the reports to estimate the QoS provided by services in the network in general.
  full reporting: for some QoS experiences a provider-specific service record (FIG. 5A) is sent—for the others a non-specific service record (FIG. 5A) is sent. Selectors receiving not only non-specific service records but also specific service records are able to learn the distribution of QoS amongst providers as well as the QoS in the network in general.

The reporting step 116 begins with a test 170 to find the reporting strategy with which the device has been configured. If the strategy is one of not reporting QoS experiences, then the process simply ends 190. If the strategy is the non-specific reporting of QoS experiences, then the device broadcasts 172 a non-specific service record (FIG. 5B) to all other devices in the network.

If the reporting strategy is found to be a full reporting strategy, then a further test 174 is carried out to find whether the latest service provision (i.e. the one just processed—FIG. 6, 104) was by the device's current favourite provider (that is the one having the provider-specific summary QoS record with the highest QoS value). If it was, then the device broadcasts 176 a non-specific service provision record (FIG. 5B). If it was not, then the device broadcasts 178 a specific service provision record (FIG. 5A).

In general, it is found that the sharing of QoS experiences improves the overall quality of service provided in the network. Surprisingly, the avoidance of advertising the performance of a device's favourite provider is found to improve the overall quality of service in the network still further. Selective reporting—i.e. not sharing the information about the top performing providers—prevents all selectors from converging on a single provider as a target for their tasks. Such convergence would overload the respective provider, thus decreasing its QoS and decreasing the overall system average QoS.

At the same time, however, clients can communicate in full about the many providers other than the top one. Full reporting is important as it allows clients to benefit from the information gathered about providers by other clients. This significantly speeds up the exploration phase as it prevents redundant effort by focusing further exploration on the providers about which limited or no information is available avoids submitting tasks to providers that have been already identified as providing low QoS Selective reporting largely maintains these advantages, but does so without undermining each selector's relationship with its top performing provider.

Once the reporting step finishes, the task processing procedure ends (FIG. 6, 120).

The way in which a selector responds to the receipt of a QoS report from another selector will now be described with reference to FIG. 11.

The process begins with a test 200 to find whether the exploration flag is set in the exploration record contained within the report. If the flag is set, then an attempt 202 to find a relevant quality register is made (note that this attempt is similar to the one carried out at the start of the service provider selection step 100—and discussed in relation to FIG. 8 step 150). If a relevant quality register is found, then the running average of previously received remote exploration QoS values (FIG. 2; 54) is updated 202. The average is updated in accordance with the following equation:

$$Q_{explore}^{remote(t+1)} = (1-\alpha)(Q_{explore}^{remote(t)}) + \alpha(q_{explore}^{remote})$$

Where $Q_{explore}^{remote}$ represents the average remote exploration QoS value and $q_{explore}^{remote}$ represents the QoS value in the exploration report just received.

Whether the received QoS report contains an exploration record or not, a further test 206 is then carried out to find whether the QoS report contains a provider-specific QoS record. If there is no such record, then the report handling process ends 220.

If the report does contain a provider-specific QoS record, then a test 208 is carried out to find whether a relevant QoS register exists (this test is identical to that described in relation to step 150 of FIG. 8 above). If no relevant QoS register exists, then a new register is created 210 in which the service and context parameters included in the received record provide the master problem (the processing carried out is similar to that described in relation to step 151 of FIG. 8 above).

Having established that a relevant quality register was either already available or has now been created, the QoS value from the record is then used to update 212 the relevant provider-specific summary QoS record in the quality register. The update process is identical to that described in relation to step 110 of FIG. 6 above.

The report handling procedure (FIG. 11) then ends 220.

Full reports are equivalent in their information content to task processing records obtained by selectors themselves. They are consequently used to update a selector's register in exactly the same way as described in relation to the selection model update step 110 above.

In summary, a peer-to-peer network operating in accordance with a service-oriented architecture is disclosed. The peers in the network request services from one another and each keeps a record of the quality of service they receive from the other peers. The peers share quality of service information with one another in order to take advantage of the improvement in the overall efficiency of the use of resources in the network offered by such information sharing. However, the invention provides a further improvement in that peers do not report the quality of service offered by the peers they have received the best quality of service from. This is found to increase the overall level of service still further since it prevents the peers converging on a favourite service provider and thereby overloading it. The invention finds particular application in distributed applications which dynamically select a Web Service to perform a function at run-time.

The invention claimed is:

1. A computer network comprising a plurality of devices interconnected via communication links, each of said devices storing a quality of service register containing information on the quality of service provided by other devices in said network, each of said devices being arranged in operation to respond to a service request by:
   selecting one of said other devices to provide the requested service;
   requesting the selected device to provide said service;
   monitoring the quality of service provided in response to said request;
   updating said quality of service register in response to said monitored quality of service; and
   reporting at least some of said quality of service experiences to other devices for updating the quality of service register in the other devices;
   wherein said selection whilst being made in dependence on said quality of service register has a probabilistic element resulting in the occasional selection of a service provider other than the highest-ranked service provider in said quality of service register;
   each of said devices being further arranged in operation to: for each service request, compare said monitored quality of service with said quality of service records, and report quality of service experiences relating to the higher-ranked service providers according to said quality of service records less thoroughly than those quality of service experiences relating to lower-ranked service providers by said devices being less likely to report a quality of service report in the event that the quality of service report relates to a higher-ranked service provider according to its quality of service register.

2. A computer network comprising a plurality of devices interconnected via communication links, each of said devices storing a quality of service register containing information on the quality of service provided by other devices in said network, each of said devices being arranged in operation to respond to a service request by:
   selecting one of said other devices to provide the requested service;
   requesting the selected device to provide said service;
   monitoring the quality of service provided in response to said request;

updating said quality of service register in response to said monitored quality of service; and reporting at least some of said quality of service experiences to other devices for updating the quality of service register in the other devices;

wherein said selection whilst being made in dependence on said quality of service register has a probabilistic element resulting in the occasional selection of a service provider other than the highest-ranked service provider in said quality of service register;

each of said devices being further arranged in operation to: for each service request, compare said monitored quality of service with said quality of service records, and report quality of service experiences relating to the higher-ranked service providers according to said quality of service records less thoroughly than those quality of service experiences relating to lower-ranked service providers by generating quality of service reports which do not identify the service provider in the event that the service provider is a higher-ranked service provider according to the quality of service register in said device.

3. A method of operating a computer network, said network comprising a plurality of devices interconnected via communication links, each of said devices storing a quality of service register containing information on the quality of service provided by other devices in said network, said method comprising operating each of said devices being arranged in operation to respond to a service request by:

selecting one of said other devices to provide the requested service; requesting the selected device to provide said service;

monitoring the quality of service provided in response to said request;

updating said quality of service register in response to said monitored quality of service; and reporting at least some of said quality of service experiences to the other devices for updating the quality of service register in the other devices;

wherein said selection whilst being made in dependence on said quality of service register has a probabilistic element resulting in the occasional selection of a service provider other than the highest-ranked service provider in said quality of service register;

said method further comprising: operating for each service request, comparing said monitored quality of service with said quality of service records, and reporting quality of service experiences relating to the higher-ranked service providers according to said quality of service records less thoroughly than those quality of service experiences relating to lower-ranked service providers by the devices being less likely to report a quality of service report in the event that the quality of service report relates to a higher-ranked service provider according to its quality of service register.

4. A computing device for use in a computer network comprising a plurality of devices interconnected via communication links, said device:

storing a quality of service register containing information on the quality of service provided by other devices in said network; and being arranged in operation to respond to a service request by:

i) selecting one of said other devices to provide the requested service;

ii) requesting the selected device to provide said service;

iii) monitoring the quality of service provided in response to said request;

iv) updating said quality of service register in response to said monitored quality of service; and v) reporting at least some of said quality of service experiences to the other devices for updating the quality of service register in the other devices;

wherein said device is arranged to select one of said other devices to provide the requested service by probabilistically selecting a service provider in dependence on said quality of service register resulting in the occasional selection of a service provider other than the highest-ranked service provider in said quality of service register;

said device being further arranged in operation to: for each service request, compare said monitored quality of service with said quality of service records, and report quality of service experiences relating to the higher-ranked service providers according to said quality of service records less thoroughly than those quality of service experiences relating to lower-ranked service providers by said device being less likely to report a quality of service report in the event that the quality of service report relates to a higher-ranked service provider according to its quality of service register.

5. A computing device for use in a computer network comprising a plurality of devices interconnected via communication links, said device:

storing a quality of service register containing information on the quality of service provided by other devices in said network; and being arranged in operation to respond to a service request by:

i) selecting one of said other devices to provide the requested service;

ii) requesting the selected device to provide said service;

iii) monitoring the quality of service provided in response to said request;

iv) updating said quality of service register in response to said monitored quality of service; and v) reporting at least some of said quality of service experiences to the other devices for updating the quality of service register in the other devices;

wherein said device is arranged to select one of said other devices to provide the requested service by probabilistically selecting a service provider in dependence on said quality of service register resulting in the occasional selection of a service provider other than the highest-ranked service provider in said quality of service register;

said device being further arranged in operation to: for each service request, compare said monitored quality of service with said quality of service records, and report quality of service experiences relating to the higher-ranked service providers according to said quality of service records less thoroughly than those quality of service experiences relating to lower-ranked service providers by generating quality of service reports which do not identify the service provider in the event that the service provider is a higher-ranked service provider according to the quality of service register in said device.

6. A non-transitory computer-readable storage medium storing instructions which upon execution enable a computing device for use in a computer network comprising a plurality of devices interconnected via communication links to perform:

storing a quality of service register containing information on the quality of service provided by other devices in said network; and being arranged in operation to respond to a service request by:

i) selecting one of said other devices to provide the requested service;
 ii) requesting the selected device to provide said service;
 iii) monitoring the quality of service provided in response to said request;
 iv) updating said quality of service register in response to said monitored quality of service; and
 v) reporting at least some of said quality of service experiences to the other devices for updating the quality of service register in the other devices;
 wherein said device is arranged to select one of said other devices to provide the requested service by probabilistically selecting a service provider in dependence on said quality of service register resulting in the occasional selection of a service provider other than the highest-ranked service provider in said quality of service register;
 said device being further arranged in operation to: for each service request, compare said monitored quality of service with said quality of service records, and report quality of service experiences relating to the higher-ranked service providers according to said quality of service records less thoroughly than those quality of service experiences relating to lower-ranked service providers by being less likely to report a quality of service report in the event that the quality of service report relates to a higher-ranked service provider according to its quality of service register by the device being less likely to report a quality of service report in the event that the quality of service report relates to a higher-ranked service provider according to its quality of service register.

7. A non-transitory computer-readable storage medium storing instructions which upon execution enable a computing device for use in a computer network comprising a plurality of devices interconnected via communication links to perform:
 storing a quality of service register containing information on the quality of service provided by other devices in said network; and being arranged in operation to respond to a service request by:
 i) selecting one of said other devices to provide the requested service;
 ii) requesting the selected device to provide said service;
 iii) monitoring the quality of service provided in response to said request;
 iv) updating said quality of service register in response to said monitored quality of service; and
 v) reporting at least some of said quality of service experiences to the other devices for updating the quality of service register in the other devices;
 wherein said device is arranged to select one of said other devices to provide the requested service by probabilistically selecting a service provider in dependence on said quality of service register resulting in the occasional selection of a service provider other than the highest-ranked service provider in said quality of service register;
 said device being further arranged in operation to: for each service request, compare said monitored quality of service with said quality of service records, and report quality of service experiences relating to the higher-ranked service providers according to said quality of service records less thoroughly than those quality of service experiences relating to lower-ranked service providers by generating quality of service reports which do not identify the service provider in the event that the service provider is a higher-ranked service provider according to the quality of service register in said device.

8. A method of operating a computer network, said network comprising a plurality of devices interconnected via communication links, each of said devices storing a quality of service register containing information on the quality of service provided by other devices in said network, said method comprising operating each of said devices being arranged in operation to respond to a service request by:
 selecting one of said other devices to provide the requested service; requesting the selected device to provide said service;
 monitoring the quality of service provided in response to said request;
 updating said quality of service register in response to said monitored quality of service; and
 reporting at least some of said quality of service experiences to the other devices for updating the quality of service register in the other devices;
 wherein said selection whilst being made in dependence on said quality of service register has a probabilistic element resulting in the occasional selection of a service provider other than the highest-ranked service provider in said quality of service register;
 said method further comprising: operating for each service request, comparing said monitored quality of service with said quality of service records, and reporting quality of service experiences relating to the higher-ranked service providers according to said quality of service records less thoroughly than those quality of service experiences relating to lower-ranked service providers by generating quality of service reports which do not identify the service provider in the event that the service provider is a higher-ranked service provider according to the quality of service register in said device.

9. A computing device for use in a computer network comprising a plurality of devices interconnected via communication links, said device comprising a processing system configured to:
 store a quality of service register containing information on the quality of service provided by other devices in said network; and being arranged in operation to respond to a service request by:
 i) select one of said other devices to provide the requested service;
 ii) request the selected device to provide said service;
 iii) monitor the quality of service provided in response to said request;
 iv) update said quality of service register in response to said monitored quality of service;
 v) report at least some of said quality of service experiences to the other devices for updating the quality of service register in the other devices;
 select one of said other devices to provide the requested service by probabilistically selecting a service provider in dependence on said quality of service register resulting in the occasional selection of a service provider other than the highest-ranked service provider in said quality of service register; and
 for each service request, compare said monitored quality of service with said quality of service records, and prevent reporting to the other devices of the quality of service experiences relating to the highest ranked service provider.

10. A method of operating a computing device for use in a computer network comprising a plurality of devices interconnected via communication links, the method comprising:

storing a quality of service register containing information on the quality of service provided by other devices in said network, and responding to a service request by:
  selecting one of said other devices to provide the requested service; requesting the selected device to provide said service;
  monitoring the quality of service provided in response to said request;
  updating said quality of service register in response to said monitored quality of service;
  reporting at least some of said quality of service experiences to the other devices for updating the quality of service register in the other devices, wherein said selection whilst being made in dependence on said quality of service register has a probabilistic element resulting in the occasional selection of a service provider other than the highest-ranked service provider in said quality of service register; and
  comparing said monitored quality of service with said quality of service records, and preventing reporting to the other devices of the quality of service experiences relating to the highest ranked service provider.

* * * * *